(12) United States Patent
Nair et al.

(10) Patent No.: US 9,609,587 B2
(45) Date of Patent: Mar. 28, 2017

(54) SYSTEM AND METHOD FOR HOST AND OS AGNOSTIC MANAGEMENT OF CONNECTED DEVICES THROUGH NETWORK CONTROLLED STATE ALTERATION

(75) Inventors: Biju Nair, Long Grove, IL (US); Sumeet S. Paul, Chicago, IL (US)

(73) Assignee: Synchronoss Technologies, Inc., Bridgewater, NJ (US)

(*) Notice: Subject to any disclaimer, the term of this patent is extended or adjusted under 35 U.S.C. 154(b) by 142 days.

(21) Appl. No.: 13/362,611

(22) Filed: Jan. 31, 2012

(65) Prior Publication Data

US 2012/0303823 A1 Nov. 29, 2012

Related U.S. Application Data

(60) Provisional application No. 61/437,907, filed on Jan. 31, 2011.

(51) Int. Cl.
*H04W 48/18* (2009.01)
*H04W 48/16* (2009.01)

(52) U.S. Cl.
CPC ........... *H04W 48/18* (2013.01); *H04W 48/16* (2013.01)

(58) Field of Classification Search
CPC .............................. H04W 48/18; H04W 48/16
See application file for complete search history.

(56) References Cited

U.S. PATENT DOCUMENTS

| | | |
|---|---|---|
| 4,989,230 A | 1/1991 | Gillig et al. |
| 5,133,080 A | 7/1992 | Borras |
| 5,260,988 A | 11/1993 | Schellinger et al. |
| 5,367,558 A | 11/1994 | Gillig et al. |
| 5,539,744 A | 7/1996 | Chu et al. |
| 5,592,491 A | 1/1997 | Dinkins |
| 5,666,399 A | 9/1997 | Bales et al. |
| 5,774,461 A | 6/1998 | Hyden et al. |
| 6,252,884 B1 | 6/2001 | Hunter |
| 6,510,219 B1 | 1/2003 | Wellard et al. |
| 6,539,237 B1 | 3/2003 | Sayers et al. |
| 6,580,916 B1 | 6/2003 | Weisshaar et al. |
| 6,757,262 B1 | 6/2004 | Weisshaar et al. |
| 6,807,423 B1 | 10/2004 | Armstrong et al. |
| 6,895,444 B1 | 5/2005 | Weisshaar et al. |
| 6,901,255 B2 | 5/2005 | Shostak |
| 6,937,877 B2 | 8/2005 | Davenport |

(Continued)

OTHER PUBLICATIONS

International Search Report and Written Opinion dated May 16, 2012 in related International Application PCT/US2012/023312, filed Jan. 31, 2012, 7 pages.

*Primary Examiner* — Joe Chacko
(74) *Attorney, Agent, or Firm* — Synchronoss Technologies, Inc.; Frederick W. Dour (57) ABSTRACT

A method and system for establishing network connectivity with a device is disclosed. A connectivity platform detects a plurality of networks. A network policy of each of the plurality of networks is determined. A signal quality of each of the plurality of networks is determined. The network policy and the signal quality of each of the plurality of networks is analyzed. A connection is established between the device and the first network of the plurality of networks based on the analysis of the network policy and the signal quality of each of the plurality of networks.

46 Claims, 5 Drawing Sheets

(56) References Cited

U.S. PATENT DOCUMENTS

| | | |
|---|---|---|
| 6,947,760 B2 | 9/2005 | Weisshaar et al. |
| 6,973,324 B2 | 12/2005 | Weisshaar et al. |
| 6,982,949 B2 | 1/2006 | Guo et al. |
| 7,062,274 B2 | 6/2006 | Shell et al. |
| 7,068,610 B2 | 6/2006 | Unruh |
| 7,092,405 B2 | 8/2006 | Guo et al. |
| 7,114,010 B2 | 9/2006 | Karaoguz et al. |
| 7,133,669 B2 | 11/2006 | Nair et al. |
| 7,154,869 B2 | 12/2006 | Guo et al. |
| 7,215,928 B2 | 5/2007 | Gage et al. |
| 7,221,658 B1 | 5/2007 | Armstrong et al. |
| 7,263,086 B2 | 8/2007 | Viikari et al. |
| 7,280,810 B2 | 10/2007 | Feher |
| 7,362,716 B2 | 4/2008 | Unruh |
| 7,373,428 B1 | 5/2008 | Armstrong et al. |
| 7,382,771 B2 | 6/2008 | Leblanc et al. |
| 7,426,178 B2 | 9/2008 | Guo et al. |
| 7,499,432 B2 | 3/2009 | Guo et al. |
| 7,515,538 B2 | 4/2009 | Gefflaut et al. |
| 7,515,568 B2 | 4/2009 | Bonta |
| 7,519,364 B2 | 4/2009 | Nair et al. |
| 7,532,571 B1 | 5/2009 | Price et al. |
| 7,620,065 B2 | 11/2009 | Falardeau |
| 7,631,270 B2 | 12/2009 | Cunningham et al. |
| 7,633,909 B1 | 12/2009 | Jones et al. |
| 7,653,392 B2 | 1/2010 | Ovadia et al. |
| 7,668,508 B2 | 2/2010 | Zheng et al. |
| 7,676,594 B2 | 3/2010 | Fukasawa et al. |
| 7,711,368 B2 | 5/2010 | Feher |
| 7,715,843 B2 | 5/2010 | Gao et al. |
| 7,720,488 B2 | 5/2010 | Feher |
| 7,725,114 B2 | 5/2010 | Feher |
| 7,734,293 B2 | 6/2010 | Zilliacus et al. |
| 7,739,402 B2 | 6/2010 | Roese et al. |
| 7,769,386 B2 | 8/2010 | Feher |
| 7,783,291 B2 | 8/2010 | Feher |
| 7,787,863 B2 | 8/2010 | van de Groenendaal |
| 7,787,882 B2 | 8/2010 | Feher |
| 7,805,143 B2 | 9/2010 | Feher |
| 7,809,374 B2 | 10/2010 | Feher |
| 7,849,150 B2 * | 12/2010 | Loeebbert et al. ............ 709/208 |
| 7,853,242 B2 | 12/2010 | Lewis et al. |
| 7,860,071 B2 | 12/2010 | Hinrikus et al. |
| 7,860,516 B2 | 12/2010 | Hodges et al. |
| 7,877,110 B2 | 1/2011 | Feher |
| 2002/0059434 A1 | 5/2002 | Karaoguz et al. |
| 2002/0082044 A1 | 6/2002 | Davenport |
| 2003/0108016 A1 | 6/2003 | Bonta |
| 2003/0161288 A1 | 8/2003 | Unruh |
| 2004/0107274 A1 | 6/2004 | Mastrianni et al. |
| 2004/0131078 A1 | 7/2004 | Gupta et al. |
| 2004/0170122 A1 | 9/2004 | Guo et al. |
| 2004/0170191 A1 | 9/2004 | Guo et al. |
| 2004/0179512 A1 | 9/2004 | Leblanc et al. |
| 2004/0187133 A1 | 9/2004 | Weisshaar et al. |
| 2004/0203863 A1 | 10/2004 | Huomo |
| 2004/0205153 A1 | 10/2004 | Weisshaar et al. |
| 2004/0219922 A1 | 11/2004 | Gage et al. |
| 2004/0224668 A1 | 11/2004 | Shell et al. |
| 2004/0233930 A1 | 11/2004 | Colby, Jr. |
| 2004/0260760 A1 | 12/2004 | Curnyn |
| 2005/0058112 A1 | 3/2005 | Lahey et al. |
| 2005/0068982 A1 | 3/2005 | Guo et al. |
| 2005/0083874 A1 | 4/2005 | Guo et al. |
| 2005/0097356 A1 | 5/2005 | Zilliacus et al. |
| 2005/0144262 A1 * | 6/2005 | Kang ................. H04L 12/2805 709/220 |
| 2005/0213542 A1 | 9/2005 | Guo et al. |
| 2005/0250508 A1 | 11/2005 | Guo et al. |
| 2005/0255856 A1 | 11/2005 | Griffin et al. |
| 2005/0260989 A1 | 11/2005 | Pourtier et al. |
| 2005/0276240 A1 | 12/2005 | Gupta et al. |
| 2006/0023738 A1 | 2/2006 | Sanda |
| 2006/0072735 A1 | 4/2006 | Shell et al. |
| 2006/0073788 A1 | 4/2006 | Halkka et al. |
| 2006/0105713 A1 | 5/2006 | Zheng et al. |
| 2006/0133307 A1 | 6/2006 | Fukasawa et al. |
| 2007/0008927 A1 | 1/2007 | Herz et al. |
| 2007/0014270 A1 | 1/2007 | Unruh |
| 2007/0019670 A1 * | 1/2007 | Falardeau ............. H04W 48/18 370/465 |
| 2007/0030116 A1 | 2/2007 | Feher |
| 2007/0032220 A1 | 2/2007 | Feher |
| 2007/0032246 A1 | 2/2007 | Feher |
| 2007/0032250 A1 | 2/2007 | Feher |
| 2007/0032832 A1 | 2/2007 | Feher |
| 2007/0232310 A1 | 10/2007 | Schiff et al. |
| 2007/0249372 A1 | 10/2007 | Gao et al. |
| 2007/0253339 A1 | 11/2007 | Ovadia et al. |
| 2007/0265018 A1 | 11/2007 | Feher |
| 2008/0043868 A1 | 2/2008 | Feher |
| 2008/0057886 A1 | 3/2008 | Feher |
| 2008/0062856 A1 | 3/2008 | Feher |
| 2008/0113614 A1 | 5/2008 | Rosenblatt |
| 2008/0137555 A1 | 6/2008 | Mahesh et al. |
| 2008/0146270 A1 | 6/2008 | Rofougaran |
| 2008/0167050 A1 | 7/2008 | Songer et al. |
| 2008/0181151 A1 | 7/2008 | Feher |
| 2008/0188206 A1 | 8/2008 | Pirzada et al. |
| 2008/0188240 A1 | 8/2008 | Feher |
| 2008/0205535 A1 | 8/2008 | Feher |
| 2008/0209046 A1 | 8/2008 | Karkanias et al. |
| 2008/0240070 A1 | 10/2008 | Feher |
| 2008/0253275 A1 | 10/2008 | Feher |
| 2008/0253353 A1 | 10/2008 | Feher |
| 2008/0281585 A1 | 11/2008 | Feher |
| 2009/0005071 A1 | 1/2009 | Forstall et al. |
| 2009/0005076 A1 | 1/2009 | Forstall et al. |
| 2009/0010205 A1 * | 1/2009 | Pratt et al. .................... 370/328 |
| 2009/0054068 A1 | 2/2009 | Halkka et al. |
| 2009/0061852 A1 | 3/2009 | Feher |
| 2009/0061870 A1 | 3/2009 | Finkelstein et al. |
| 2009/0066667 A1 | 3/2009 | Feher |
| 2009/0076803 A1 | 3/2009 | Feher |
| 2009/0092114 A1 | 4/2009 | Feher |
| 2009/0098852 A1 | 4/2009 | Feher |
| 2009/0147771 A1 | 6/2009 | Seal et al. |
| 2009/0170431 A1 | 7/2009 | Pering et al. |
| 2009/0175239 A1 | 7/2009 | Grinshpun et al. |
| 2009/0207817 A1 | 8/2009 | Montemurro et al. |
| 2009/0215404 A1 | 8/2009 | Kesavan et al. |
| 2009/0247187 A1 | 10/2009 | Feher |
| 2009/0270113 A1 | 10/2009 | Feher |
| 2009/0286531 A1 | 11/2009 | Bhatt et al. |
| 2009/0296703 A1 | 12/2009 | Peng |
| 2009/0310562 A1 | 12/2009 | Medapalli |
| 2009/0310591 A1 | 12/2009 | Feher |
| 2010/0014507 A1 | 1/2010 | Linkola et al. |
| 2010/0029284 A1 | 2/2010 | Feher |
| 2010/0035594 A1 | 2/2010 | Vendrow et al. |
| 2010/0056200 A1 | 3/2010 | Tolonen |
| 2010/0067595 A1 | 3/2010 | Feher |
| 2010/0097956 A1 | 4/2010 | Tauil et al. |
| 2010/0100642 A1 | 4/2010 | Zheng et al. |
| 2010/0110921 A1 | 5/2010 | Famolari et al. |
| 2010/0124920 A1 | 5/2010 | Feher |
| 2010/0128664 A1 | 5/2010 | Denny et al. |
| 2010/0128862 A1 | 5/2010 | Vendrow |
| 2010/0130238 A1 | 5/2010 | Kupsh et al. |
| 2010/0144371 A1 | 6/2010 | Savoor |
| 2010/0159945 A1 | 6/2010 | Brisebois |
| 2010/0173657 A1 | 7/2010 | Gao et al. |
| 2010/0180016 A1 * | 7/2010 | Bugwadia ............. G06F 9/4411 709/220 |
| 2010/0184377 A1 | 7/2010 | Zilliacus et al. |
| 2010/0192075 A1 | 7/2010 | Black et al. |
| 2010/0208852 A1 | 8/2010 | Feher |
| 2010/0223287 A1 * | 9/2010 | Lim ........................... 707/769 |
| 2010/0235285 A1 * | 9/2010 | Hoffberg .................... 705/75 |
| 2010/0255858 A1 | 10/2010 | Juhasz |
| 2010/0291898 A1 | 11/2010 | Sanding et al. |
| 2010/0291910 A1 | 11/2010 | Sanding et al. |
| 2010/0302958 A1 | 12/2010 | Wietfeldt et al. |
| 2010/0303008 A1 | 12/2010 | Wietfeldt et al. |

(56) References Cited

U.S. PATENT DOCUMENTS

| | | | |
|---|---|---|---|
| 2010/0304737 A1* | 12/2010 | Jain et al. | 455/426.1 |
| 2011/0026506 A1 | 2/2011 | Macnaughtan et al. | |
| 2011/0034179 A1 | 2/2011 | David et al. | |
| 2011/0119329 A1* | 5/2011 | Gullin | H04L 67/16 709/203 |
| 2011/0320588 A1* | 12/2011 | Raleigh | 709/224 |
| 2012/0039262 A1* | 2/2012 | Walsh | 370/329 |

* cited by examiner

SYSTEM AND METHOD FOR HOST AND OS AGNOSTIC MANAGEMENT OF CONNECTED DEVICES THROUGH NETWORK CONTROLLED STATE ALTERATION

CROSS-REFERENCE TO RELATED APPLICATIONS

The present application claims the benefit of U.S. Provisional Application Ser. No. 61/437,907 filed 31 Jan. 2011, which is incorporated herein by reference in its entirety.

BACKGROUND OF THE INVENTION

The present invention relates to management of network connectivity for devices.

Existing connectivity management solutions for managing connectivity of devices to networks are very dependent on the actual devices and/or specific operating systems being used by the devices. As a result, custom development and integrated testing for each new device is required, even if there are only slight differences between a new device and an existing device. Custom development and testing of each new device increases costs significantly and also increases the time to market for new devices. Thus, mobile operators are not able to efficiently market new products in a timely fashion and consumers experience the increase in costs due to custom development procedures and testing. Additionally, as network resources and bandwidth are not infinite, the demand for these resources from devices may far exceed supply in the future. Connected devices and network operators will need to manage the state of these devices in order to assist in management of the usage of all available resources.

Furthermore, existing solutions place a large burden on mobile network operators where changes to back office systems of the mobile network operator triggers changes in the corresponding devices that connect through the mobile network operators. These solutions are not easily sustainable and do not scale in an environment where mobile network operators anticipate connected devices of all varieties to coexist on their networks.

BRIEF SUMMARY OF THE INVENTION

The present invention provides a method for establishing network connectivity with a device. A connectivity platform detects a plurality of networks. A network policy of each of the plurality of networks is determined. A signal quality of each of the plurality of networks is determined. The network policy and the signal quality of each of the plurality of networks is analyzed. A connection is established between the device and the first network of the plurality of networks based on the analysis of the network policy and the signal quality of each of the plurality of networks.

In a further embodiment, detecting a plurality of networks comprises detecting a plurality of networks capable of establishing a connection with the device using at least one transceiver of the device.

In a further embodiment, determining a network policy of each of the plurality of networks comprises receiving the network policy of each of the plurality of networks from a policy server via a push policy based on the device being active.

In a further embodiment, determining a signal quality of each of the plurality of networks comprises receiving signal quality data associated with each of the plurality of networks in response to a pull policy of the device.

In a further embodiment, analyzing the network policy and the signal quality of each of the plurality of networks comprises comparing the network policies of each of the plurality of networks to determine at least one network policy compatible with the device and comparing the signal quality of each of the at least one network policy to determine an optimal network for establishing a connection with the device. The optimal network may be the first network.

In a further embodiment, a connection is established between the device and a second network of the plurality of networks in response to the device losing the connection to the first network.

In a further embodiment, a second network of the plurality of networks to establish a connection with the device is determined in response to determining that the connection with the first network is insufficient to support continued data transfer. The connection of the device is then transferred from the first network to the second network.

In a further embodiment, a transceiver of a plurality of transceivers of the device is selected to establish the connection between the device and the first network. An instruction is transmitted to the device to power down transceivers not associated with the connection between the device and the first network.

In a further embodiment, the connectivity platform is accessed by a device via an HTTP accessible user interface.

In a further embodiment, the device is associated with a device policy, and an instruction may be transmitted to the device to override the device policy and the network policy of the first network.

In a further embodiment, analyzing the network policy and the signal quality of each of the plurality of networks comprises determining at least one policy implementation factor of the device, and selecting an optimal network for connection with the device based on the at least one policy implementation factor.

In a further embodiment, analyzing the network policy and the signal quality of each of the plurality of networks comprises determining a device state of the device, and selecting an optimal network for connection with the device based on the device state.

In a further embodiment, analyzing the network policy and the signal quality of each of the plurality of networks comprises analyzing content being transmitted to or being requested by the device and selecting an optimal network for the content based on the network policy and the signal quality of each of the plurality of networks.

In an embodiment, a system for establishing network connectivity with a device is disclosed. A policy server stores network policies associated with a plurality of networks and a device policy associated with the device. A connectivity platform is configured to detect the plurality of networks, determine the network policies associated with each of the plurality of networks from the policy server, determine a signal quality of each of the networks, analyze the network policies associated with each of the plurality of networks and the signal quality of each of the plurality of networks, and establish a connection between the devices and a first network of the plurality of networks.

In a further embodiment, the connectivity platform is configured to detect the plurality of networks which are capable of establishing a connection with the device using at least one transceiver of the device.

In a further embodiment, the connectivity platform is further configured to receive the network policies associated with each of the plurality of networks from the policy server via a push policy based on the device being active.

In a further embodiment, the connectivity platform is further configured to receive the signal quality of each of the plurality of networks in response to a pull policy of the device.

In a further embodiment, the connectivity platform is further configured to compare the network policies associated with each of the plurality of networks to determine at least one network policy compatible with the device, and compare the signal quality of each of the at least one network policy to determine an optimal network for establishing a connection with the device. The optimal network may be the first network.

In a further embodiment, the connectivity platform is further configured to establish a connection between the device and a second network of the plurality of networks in response to the device losing the connection to the first network.

In a further embodiment, the connectivity platform is further configured to determine a second network of the plurality of networks to establish a connection with the device in response to determining that the connection with the first network is insufficient to support continued data transfer, and transfer the connection of the device from the first network to the second network.

In a further embodiment, the connectivity platform is further configured to select a transceiver of a plurality of transceivers of the device to establish the connection between the device and the first network, and transmit an instruction to the device to power down transceivers not associated with the connection between the device and the first network.

In a further embodiment, the connectivity platform is accessed by the device via an HTTP accessible user interface.

In a further embodiment, the device is associated with a device policy and the connectivity platform is further configured to transmit an instruction to the device to override the device policy and use the network policy of the first network.

In a further embodiment, the connectivity platform is further configured to determine at least one policy implementation factor of the device, and select an optimal network for connection with the device based on the at least one policy implementation factor.

In a further embodiment, the connectivity platform is further configured to determine a device state of the device, and select an optimal network for connection with the device based on the device state.

In a further embodiment, the connectivity platform is further configured to analyze the content being transmitted to or being requested by the device, and select an optimal network for the content based on the network policy and the signal quality of each of the plurality of networks.

In an embodiment, a computer readable medium encoded with computer program instructions establishing network connectivity of a device is disclosed. The computer program instructions when executed by a processor, causes the processor to perform the steps comprising: detecting a plurality of networks, determining a network policy of each of the plurality of networks, determining a signal quality of each of the plurality of networks, analyzing the network policy and the signal quality of each of the plurality of networks, and establishing a connection between the device and a first network of the plurality of networks based on the analyzing.

In a further embodiment, the computer program instructions causing the processor to perform the step of detecting a plurality of networks, further causes the processor to perform the step comprising detecting a plurality of networks capable of establishing a connection with the device using at least one transceiver of the device.

In a further embodiment, the computer program instructions causing the processor to perform the step of determining a network policy of each of the plurality of networks, further causes the processor to perform the step comprising receiving the network policy of each of the plurality of networks from a policy server via a push policy based on the device being active.

In a further embodiment, the computer program instructions causing the processor to perform the step of determining a signal quality of each of the plurality of networks, further causes the processor to perform the step comprising receiving signal quality data associated with each of the plurality of networks in response to a pull policy of the device.

In a further embodiment, the computer program instructions causing the processor to perform the step of analyzing the network policy and the signal quality of each of the plurality of networks, further causes the processor to perform the steps comprising comparing the network policies of each of the plurality of networks to determine at least one network policy compatible with the device, and comparing the signal quality of each of the at least one network policy to determine an optimal network for establishing a connection with the device. The optimal network may be the first network.

In a further embodiment, the computer program instructions when executed by the processor, cause the processor to perform the step comprising establishing a connection between the device and a second network of the plurality of networks in response to the device losing the connection to the first network.

In a further embodiment, the computer program instructions when executed by the processor, cause the processor to perform the step comprising determining a second network of the plurality of networks to establish a connection with the device in response to determining that the connection with the first network is insufficient to support continued data transfer, and transferring the connection of the device from the first network to the second network.

In a further embodiment, the computer program instructions when executed by the processor, cause the processor to perform the step comprising selecting a transceiver of a plurality of transceivers of the device to establish the connection between the device and the first network, and transmitting an instruction to the device to power down transceivers not associated with the connection between the device and the first network.

In a further embodiment, the connectivity platform is accessed by a device via an HTTP accessible user interface.

In a further embodiment, the computer program instructions when executed by the processor, cause the processor to perform the step comprising transmitting an instruction to the device to override a device policy associated with the device and use the network policy of the first network.

In a further embodiment, the computer program instructions causing the processor to perform the step of analyzing the network policy and the signal quality of each of the plurality of networks, further causes the processor to perform the steps comprising determining at least one policy implementation factor of the device, and selecting an optimal network for connection with the device based on the at least one policy implementation factor.

In a further embodiment, the computer program instructions causing the processor to perform the step of analyzing the network policy and the signal quality of each of the plurality of networks, further causes the processor to perform the steps comprising determining a device state of the device, and selecting an optimal network for connection with the device based on the device state.

In a further embodiment, the computer program instructions causing the processor to perform the step of analyzing the network policy and the signal quality of each of the plurality of networks, further causes the processor to perform the steps comprising analyzing content being transmitted to or being requested by the device, and selecting an optimal network for the content based on the network policy and the signal quality of each of the plurality of networks.

In a further embodiment, a method and system for establishing network connectivity with a device comprises a connectivity platform that detects a plurality of networks. A network policy of each of the plurality of networks is determined. A signal quality of each of the plurality of networks is determined. A plurality of connections is established between the device and the plurality of connections. All except one of the plurality of connections between the device and the plurality of networks is terminated. Termination is based on determining which network is most capable for data to be transmitted or requested from the device, or which one of the networks offers a highest data throughput rate. Signal degradation may be detected in the one unterminated connection. A wake-up signal may be transmitted to a plurality of transceivers to wake and determine signal quality with respective networks capable of connecting with the plurality of receivers. Based on the determined signal quality, a new network is selected for connection. The new network may be selected based on signal quality of which network is best suited for data transmission of specific data content or highest data throughput signal. Each of the transceivers may be set to wake-up at a predetermined time to check signal quality with at least one of the plurality of networks.

DETAILED DESCRIPTION

With the advent of ubiquitous mobile broadband availability and the increasing number of devices supporting network connectivity, systems for managing all aspects of connectivity must be more flexible and device agnostic—independent of device type and device operating system.

The present invention is directed to a method and system for management of network connectivity for devices. More specifically, embodiments of the present invention described herein facilitate efficient management of network connectivity for devices by leveraging the state of the device and managing the network connectivity of devices through a user interface that is device and platform agnostic. Mobile operators will be able to speed time to market and launch specific services with devices in mind. Consumers will experience an improved out of box experience. Consumers, for example, will be able to purchase a consumer electronic device or computing device in any retail or internet electronic store without requiring any special knowledge or need to purchase equipment to be able to connect and authenticate their device with a mobile broadband network. The embodiments described herein along with supporting figures are meant to provide an understanding of a network connectivity platform, and it is understood that embodiments of the present invention may be performed within a computing system using data stored within the computing system.

Figure 1:
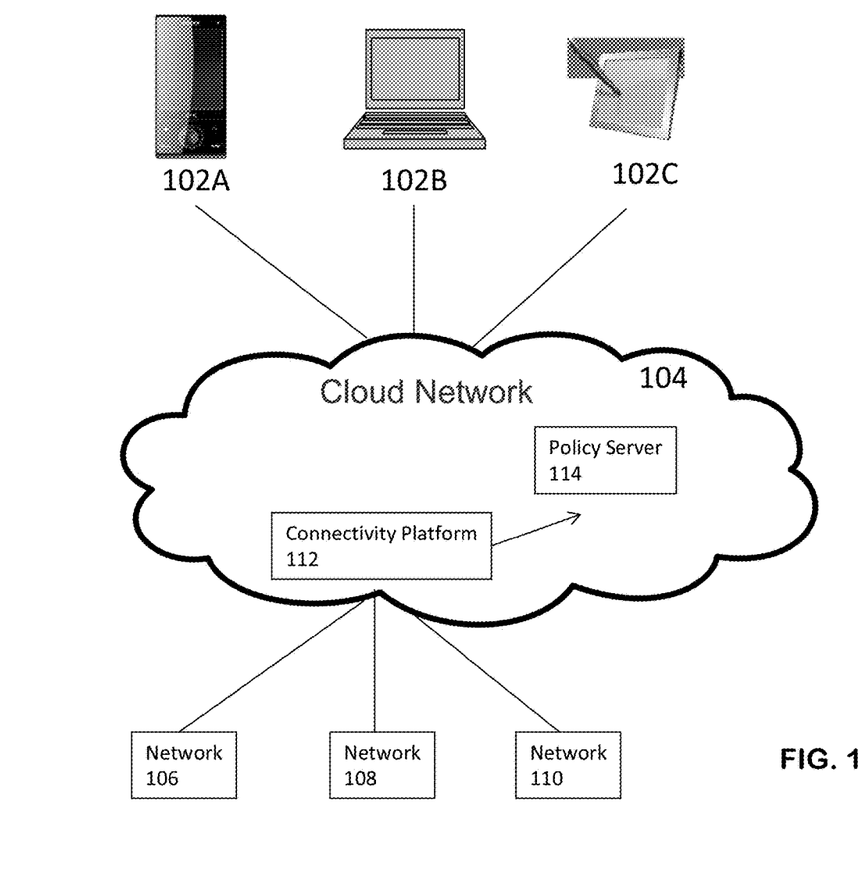
FIG. 1 illustrates a system including a network connectivity platform facilitating automatic establishment of network connections between devices and networks, in accordance with an embodiment of the present invention.

FIG. 1 illustrates a system including a network connectivity platform facilitating automatic establishment of network connections between devices and networks, in accordance with an embodiment of the present invention. Devices 102A, 102B, and 102C may be any device configured to connect to networks to receive data, including, but not limited to, mobile communication devices, computing devices, or any device supporting radio transceivers capable of communicating with different networks. Typically, users of devices 102A, 102B, and 102C must manually connect to any of networks 106, 108, and 110 using a platform resident on the device. Networks 106, 108, and 110 may be, but not limited to, a Wi-Fi, LTE, EV-DO, HSPA, 3G, or 4G network. In the embodiments described herein, devices 102A, 102B, and 102C instead may establish connectivity automatically via connectivity platform 112 which resides within cloud network 104.

Connectivity platform 112 leverages information from various sources, including devices such as devices 102A, 102B, and 102C, and networks 106, 108 and 110, along with associated back office systems in order to ensure more efficient connectivity of devices to networks and more efficient use of network resources. Connectivity platform 112 is accessible by devices 102A, 102B, and 102C thru any HTTP enabled web browser. This allows connectivity platform 112 to be device and platform agnostic. More specifically, connectivity platform provides an HTTP accessible user interface, accessible and viewable thru a web browser residing at any of devices 102A, 102B, and 102C. Accessing connectivity platform 112 through an HTTP accessible user interface eliminates any requirement of specialized code between mobile network operator (such as networks 106, 108, and 110) back office systems, such as activation servers, update management, pricing plan management, and billing systems. This also promotes flexibility at a mobile network operator's back office systems to change those systems as needed without the need to worry about connectivity issues with devices.

A device, for example, 102A, may access connectivity platform 112 to assist in establishing connectivity to one of networks 106, 108, or 110. Connectivity platform 112 is responsible for selecting an optimal network for connection with device 102A based on a variety of factors including network policies associated with each of the networks, signal quality provided by each of the networks, and in some instances, policies of the device itself, and a state of the device. A state of the device may refer to for example, a geographic location of the device and power consumption of various radio transceivers integrated with the device.

For purposes of illustration only, FIG. 1 depicts three devices 102A, 102B, and 102C and three networks 106, 108, and 110. It is understood that connectivity platform 112 is capable of interfacing and establishing connections between any number of devices and networks.

Figure 2:
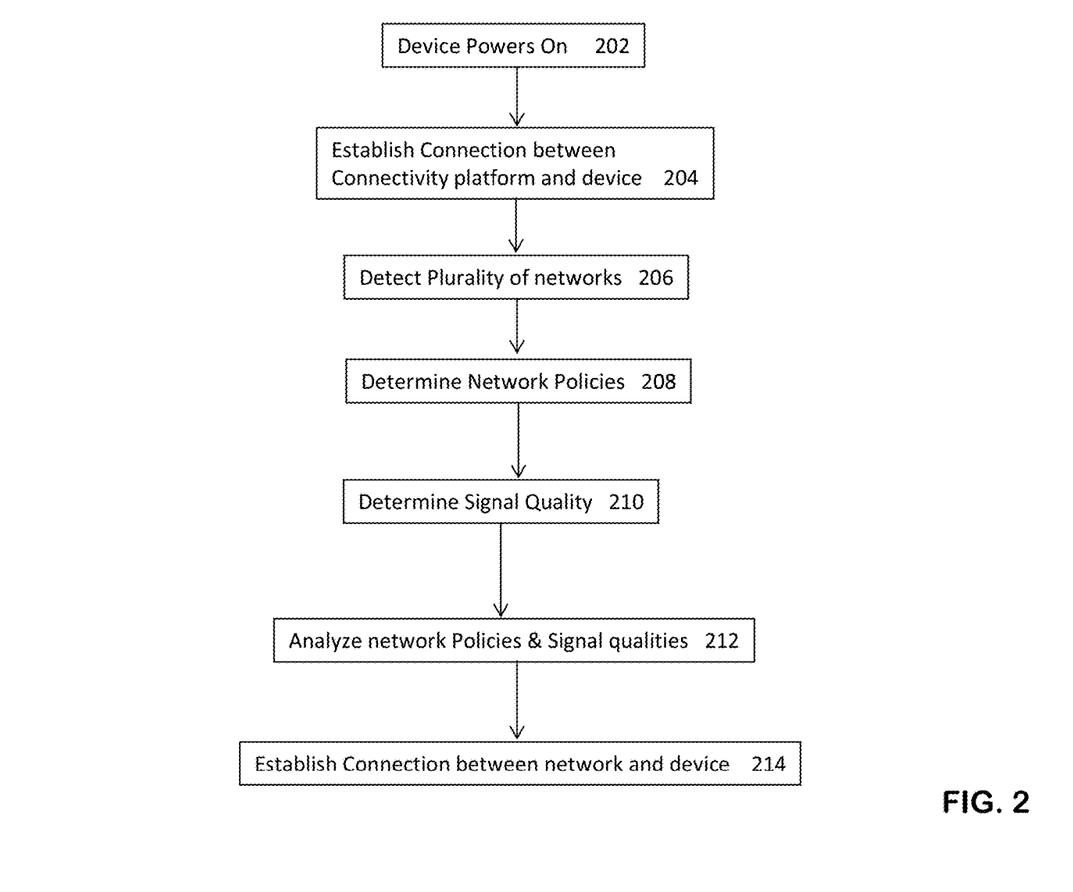
FIG. 2 illustrates a method for establishing connectivity between a device and a network using a connectivity platform, in accordance with an embodiment of the present invention.

FIG. 2 illustrates a method for establishing connectivity between a device and a network using a connectivity platform, in accordance with an embodiment of the present invention. At step 202, a device, for example, device 102A, powers on.

At step 204, connectivity platform 112 detects device 102A in response to device 102A powering on, and establishes a connection with device 102A.

Once connectivity platform 112 has established a connection with a device, such as device 102A, the method proceeds to step 206. At step 206, connectivity platform 112 detects a plurality of networks. For example, connectivity platform detects networks 106, 108, and 110 which are available for connection with device 102A. When detecting a plurality of networks, connectivity platform 112 initiates an instruction to device 102A to turn on all radio transceivers. Once radio transceivers of device 102A are on, connectivity platform 112 detects all networks capable of establishing a connection with device 102A via any of the radio transceivers of device 102A.

At step 208, connectivity platform 112 determines a network policy of each of the plurality of networks (networks 106, 108, and 110). Once connectivity platform 112 is connected with a device, any available networks of the plurality of networks will transmit their network policies to the device via connectivity platform 112 using a push policy. The push policy is based on the device being active. Thus, if device 102A is active and in communication with connectivity platform 112, networks 106, 108, and 110 may automatically transmit their network policies to device 102A via connectivity platform 112.

In an alternative embodiment, policies of networks may be stored in a policy server 114 associated with connectivity platform 112. In this situation, once a connection is established between connectivity platform, and a device, for example, device 102A, connectivity platform 112 will receive network policies of each of the available networks from the policy server 114, also via a push policy dictating that the policy server 114 will transmit the network policies based on the device being active.

Each network policy includes information such as choice of networks to connect to and circumstances meriting a network switch. For example, a network policy associated with network 106 may dictate that if a signal quality of network 106 is insufficient for the type of data requested by device 102A, the connection between device 102A and network 106 should be transferred to network 108.

At step 210, connectivity platform 112 determines a signal quality of each of the plurality of networks (networks 106, 108, and 110). After receiving network policies of the plurality of networks, connectivity platform 112 must determine the signal quality of data transmission from each of the networks to the device to assist in determining which network is optimal to establish a connection with the device. Signal quality data associated with the networks is received in response to a push policy of the device.

At step 212, connectivity platform 112 analyzes the network policy and the signal quality of each of the plurality of networks. In analyzing the network policy and signal quality of each of the plurality of networks, connectivity platform 112 compares each of the network policies and determines at least one network policy that is compatible with the device. The at least one network policy represents a subset of the network policies of the plurality of networks that is suitable for connection with the device. Certain network policies may not be compatible with device policies and may also not be compatible with particular types of data requested by the device.

For example, a device policy of device 102A may be stored at the aforementioned policy server 114 associated with connectivity platform 112. The plurality of network policies may be compared to determine which is compatible with device 102A.

After comparing the network policies to determine the at least one network policy compatible with the device, the signal quality of each of the at least one network policy or subset of the network policies is compared to determine an optimal network for establishing a connection with the device. Typically, the optimal network is the network with a network policy compatible with the device and with the highest signal quality to facilitate data transfer between the device and the network.

For example, device 102A may wish to receive multimedia data via a 4G network. Network 106 may be a 3G network, and networks 108 and 110 may be 4G networks. In comparing network policies, connectivity platform 112 will determine that network 106 does not have a network policy consistent with the needs of device 102A. The at least one network policy in this example will be networks 108 and 110 which offer 4G connectivity. Connectivity platform 112 then determines a signal quality associated with each of networks 108 and 110. If, for example, network 108 has a higher signal quality then network 110, then connectivity platform 112 will select network 108 as the optimal network for establishing a connection with the device.

At step 214, connectivity platform 112 establishes a connection between the device and a network based on the analysis of the network policy and signal quality of each of the plurality of networks. Connectivity platform establishes a connection between device 102A and an optimal network of the plurality of networks. Selection of the optimal network is discussed above with respect to analysis of the network policy and the signal quality of each of the plurality of networks. With respect to the example discussed above, connectivity platform 112 would establish a connection between device 102A and network 108.

While connectivity platform 112 facilitates establishing connectivity between a network and a device, connectivity platform 112 maintains an active role even after connectivity is established. Since connectivity platform 112 has access to network policies stored in the policy server 114, in the event that a device loses connection with a first network, connectivity platform 112 may automatically determine a second network to establish a connection with. For example, if device 102A were to lose connection to network 108, connectivity platform 112 would establish a connection with a different network in response to detecting that device 102A and network 108 have lost their connection. In doing so, connectivity platform 112 may once again detect available networks, determine network policies and signal qualities of the networks, and select a new optimal network on the basis of analyzing the network policies and signal qualities. Connectivity platform 112 may also establish a connection with the second network on the basis of the network policy of the first network. For example, the network policy of network 108 specifies that if a connection were lost with a device, the device should then attempt to connect with network 110. Thus, if device 102A loses connection to network 108, connectivity platform 112 automatically initiates the establishment of a connection between the device and network 110.

Connectivity platform 112 may also facilitate connection transfers from a first network to a second network on a proactive basis. For example, connectivity platform 112 may continuously monitor the signal quality between a device and the network it is connected to. Based on the monitoring of the signal quality, connectivity platform 112 may determine that the signal quality is insufficient for the data needs of the device or that the signal quality has degraded to a level that no longer supports continued data transfer. At this point, connectivity platform 112 may determine a new optimal network or second network of the plurality of networks to establish a connection with the device. Once the second network is determined, the connection of the device with the first network is transferred to the second network.

In a further embodiment, either connectivity platform 112 or the device may monitor continuously for signal degradation of a connected network. When a signal has been significantly degraded, connectivity platform 112 or the device itself may send a wake-up signal to other transceivers of the device to determine a different network to establish connection with. The various transceivers may be set to wake at predetermined periods of time or set to have predetermined wake-up times to check for signal quality of other accessible networks to assist connectivity platform 112 and the device. This gives the device and connectivity platform 112 the ability to continuously monitor for networks providing better signal quality and automatic network switching whenever degraded signal quality is detected on a connected network.

In a further embodiment, connectivity platform 112 may use an algorithm to analyze the network policies and signal qualities of the networks which also takes into account various device related factors. These factors may include, but are not limited to: device type, specific radio transceiver availability of the device, geographic location of the device, motion information associated with the device, subscription plan of the device, and device specific policies set by a user of the device. For example, if device 102A is a smartphone that is only 3G enabled and not 4G enabled, in analyzing the network policies and signal qualities of the networks to select an optimal network, connectivity platform 112 will exclude from consideration any network policies that require 4G connectivity. In another example, connectivity manager 112 may use the geographic location of the device to determine the location of the device. If the smartphone device 102A is Wi-Fi enabled, and the geographic location of device 102A is determined to be in a Wi-Fi zone, connectivity manager 112 may automatically select a wi-fi network as the optimal network as opposed to a traditional cellular network to facilitate cost savings for the user of device 102A. In yet another example, when selecting an optimal network, connectivity platform 112 may use a device policy associated with the device. The device policy may, for example, dictate that a 3G connection should be used for telephone calls, and a 4G connection used for receiving or transferring multimedia, such as video or audio files. Connectivity platform 112, in analyzing the network policies and signal qualities to determine an optimal network, will take the device policy into account and attempt to find a network with 3G connectivity if the device us being used for a telephone call, or a network with 4G connectivity if the device is used for transfer of multimedia. These examples illustrate situations where connectivity platform 112 establishes a connection between networks and a device not only on the basis of network policies and signal quality, but also on the basis of a device state taking into account device related factors.

In a further embodiment, connectivity platform 112 may select a transceiver of a plurality of transceivers of the device to establish the connection between the device and the first network. For example, device 102A may be connected with network 108, which provides 4G connectivity. In order to fully take advantage of the 4G connectivity, connectivity platform 112 ensures that the appropriate radio transceiver of device 102A for communicating via 4G is selected.

As most devices on the market currently have multiple wireless transceiver radios for communicating with networks, as will future devices, multiple radio transceivers that are continuously searching for a signal is a burden on the battery life of the device. Connectivity platform 112 may also handle power management of devices, specifically by handling the power drawn from the radio transceivers. Returning to the aforementioned example, after an appropriate transceiver is selected, connectivity platform 112 may transmit an instruction to the device to power down all other radio transceivers that are not associated with the connection between device 102A and network 108. The powered down radio transceivers maintain a reduced power consumption state with the ability to wake and draw full power if connectivity platform 112 determines that a different radio transceiver is needed for transmission of data.

In a further embodiment, connectivity platform 112 facilitates for intelligent management of content being uploaded and downloaded. Connectivity platform 112 can analyze a request for certain content or content types made by a device and select an optimal network to serve the content to the device.

In a further embodiment, connectivity platform 112 facilitates intelligent management of access to connectivity. Connectivity platform 112 may ensure that devices are used by authorized users only. Providing access to broadband services by way of "tethering" one device to another device which is already connected to a broadband network is becoming increasingly common. Tethering may be accomplished using Bluetooth, USB, Wi-Fi, Ethernet, Infrared, or any other pairing mechanism for interfacing devices with each other. Connectivity platform 112 is adapted to intercept any attempted use of a device for tethering, and verify with a service provider billing system first, before establishing connection to a network, to ensure that usage is authorized and used by subscribers paying for the "tethering" service.

Figure 3:
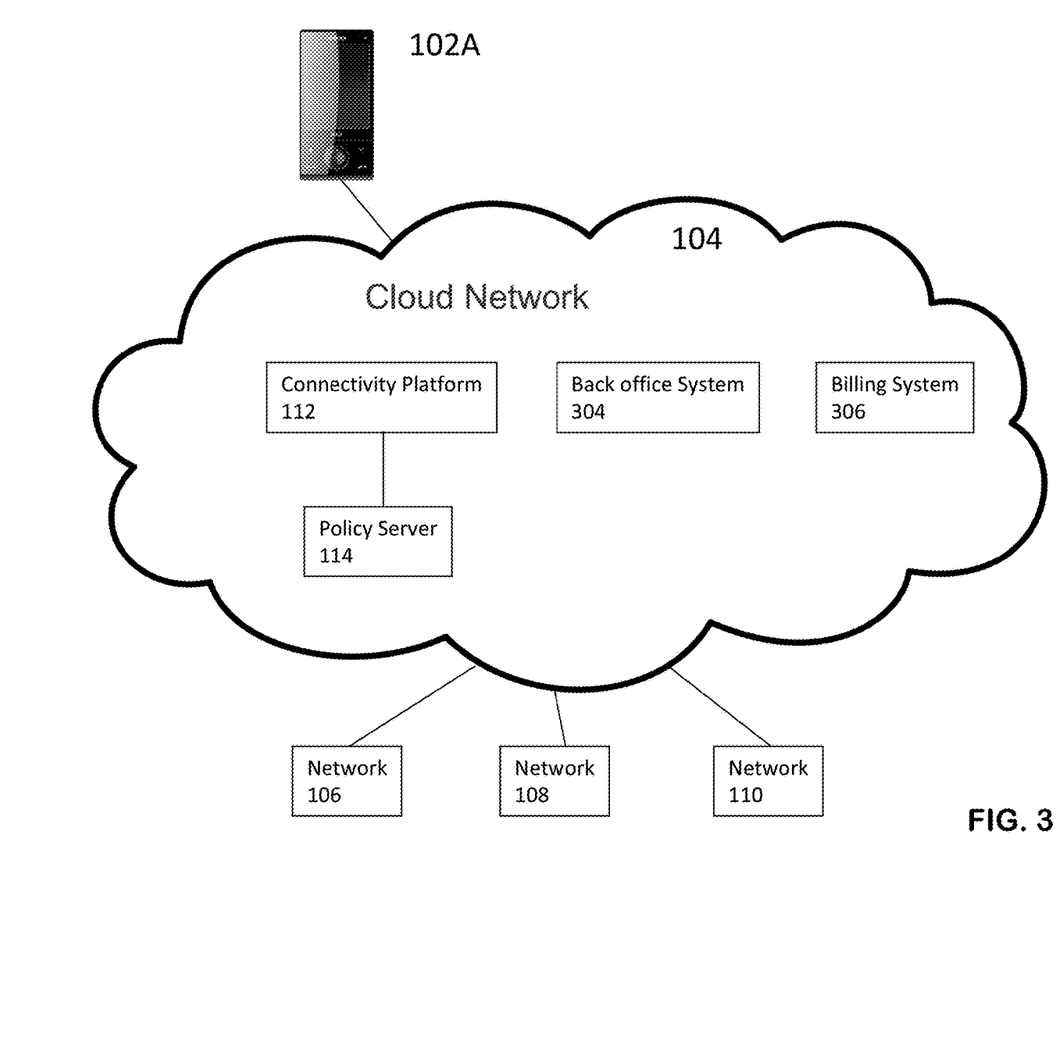
FIG. 3 illustrates a system including a network connectivity platform and associated components to further illustrate features of the connectivity platform, in accordance with an embodiment of the present invention.

FIG. 3 illustrates a system including a network connectivity platform and associated components to further illustrate features of the connectivity platform, in accordance with an embodiment of the present invention. Connectivity platform 112 may also assist with critical activities associated with devices that are integrated with the normal flow of operations of a mobile operator's network. For example, connectivity platform 112 may facilitate device and service activation, updates to pricing plan subscriptions, updates to payment plans, device management and maintenance, and installation of new services to the device. Since a device, such as device 102A communicates with connectivity platform 112 through a web browser accessible HTTP user interface, connectivity platform 112 facilitates seamless communication with any back-office servers associated with a mobile operator's network.

In an embodiment, device 102A may be a newly purchased smartphone that needs device and service activation. Upon a user powering on device 102A, device 102A automatically establishes a connection with connectivity platform 112. Connectivity platform upon detecting the device state of device 102A (new device requiring activation), will select the appropriate network to establish a connection with device 102A. After the connection between device 102A, and, for example, network 106, is established, connectivity platform 112 facilitates all device and service activation steps required so that device 102A is ready for use with an appropriate service plan selected by the user. Connectivity platform 112 can determine the necessary information to complete the device and service activation by accessing back office systems 304 and billing systems 306 of the appropriate network.

In yet another embodiment, device 102A may be a smartphone in need of device maintenance or a software upgrade. Connectivity platform 112, by leveraging access to back office systems 304 and billing systems 306 may automatically deliver the device maintenance payload or software upgrade to device 102A from an appropriate network. Connectivity platform 112 will determine the appropriate network based on the capabilities of the device and facilitate the upgrade or maintenance of the device.

Figure 4:
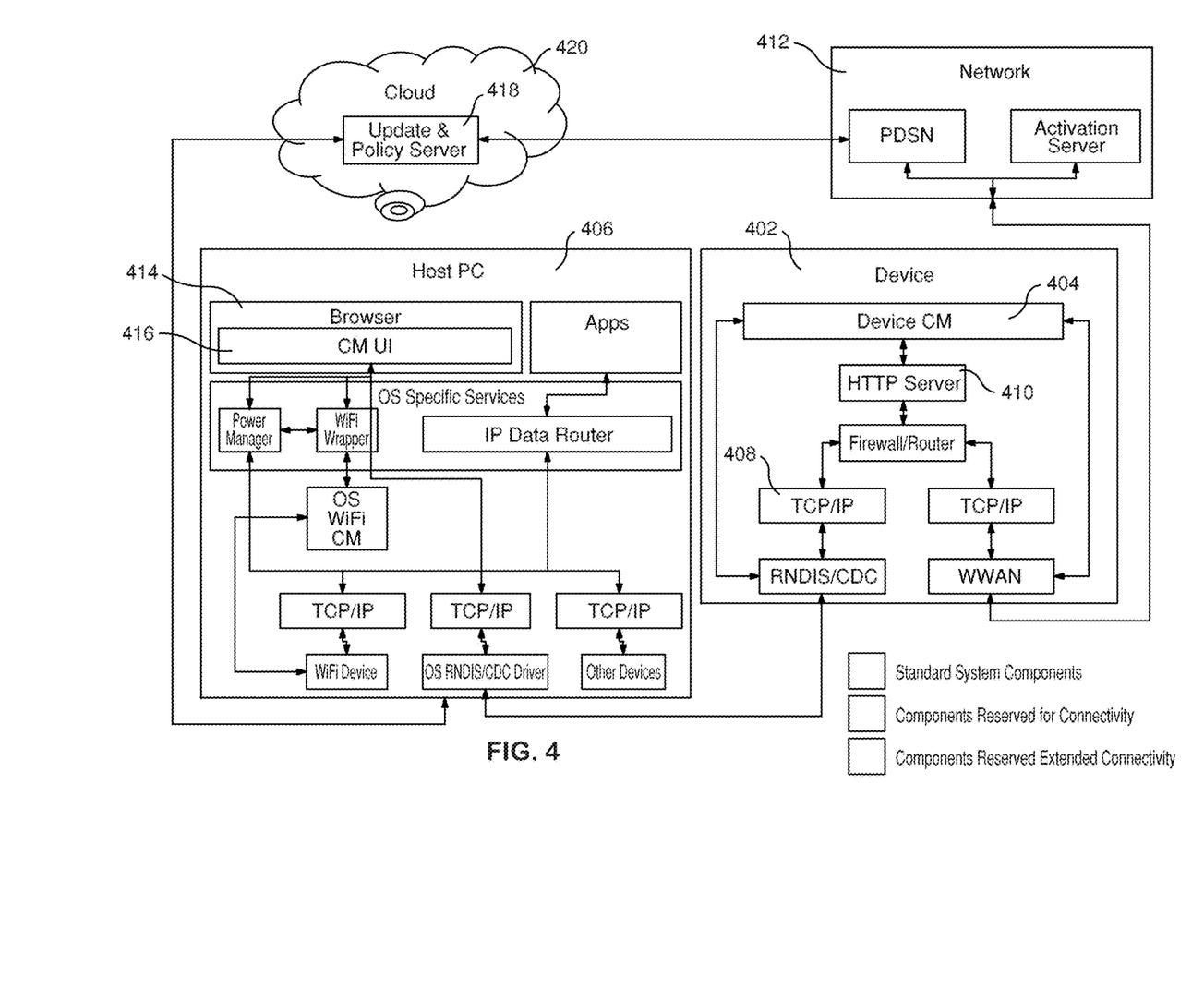
FIG. 4 illustrates a system including a host computing device which interfaces with the device, an update and policy server, and network in accordance with an embodiment of the present invention.

FIG. 4 illustrates a system including a host computing device which interfaces with the device, an update and policy server, and network in accordance with an embodiment of the present invention. Core connection control logic may be placed within the core of a device in order to make the connection control logic web accessible. For example, in FIG. 4, device 402 includes a device CM (connectivity manager) 404 that includes core connection control logic. Additional security features may be enabled such that a mobile carrier, device OEM (original equipment manufacturer), or third party remote support personnel can securely access device 402 from a host device 406 without compromising the security of either host device 406. Device 402, due to inclusion of a TCP/IP router 408 and HTTP server 410 allows restricted access to information, status, and device configuration controls while limiting certain other information to facilitate efficient access by host device 406.

Additionally, having core connection control logic within device CM 404 allows device 402 to leverage capabilities available through Personal Area Networking (PAN) built into the devices. PAN support allows multiple devices with device CMs similar to that of device 402 to discover and combine networking resources when in proximity with each other. By way of example, if device 402 is a laptop, and two other devices, a tablet and handset from the same manufacturer are in proximity, each of the aforementioned devices would be able to discover one another over any shared network, such as 4G, 3G, or Wi-Fi. Once the devices are discovered, they may share any available bandwidth based on a subscriber plan in order to optimize plan usage.

For example, device 402 establishes a Wi-Fi network connection with a PC, such as host device 406. Device 402 may then share the Ethernet backhaul of the PC based on information exchanged between device 402 and any other devices in proximity having a device CM. As a result, all devices may make more intelligent decisions regarding connectivity and network bandwidth usage.

Host device 406 includes a limited operating system environment of an embedded operating system to increase the effective security of an operating system operating at host device 406. Host device 406 can manage connectivity of device 402 with various networks, such as network 412, through a browser 414 and connectivity management user interface 416 accessible through browser 414. Host device 406 essentially serves as a WWAN (wireless wide access network) to transfer data between network 412 and device 402.

Connectivity management user interface 416 operates similarly to connectivity platform 112 discussed above. For example, connectivity management user interface 416 establishes a connection between device 402 and network 412 based upon device and network policies stored at update and policy server 418. This may facilitate a situation where device 402 may have "instant" access to network 412 after purchasing a single session pass because connectivity management user interface 416 of host device 406 will automatically determine the network to connect with device 402. Certain content may also be easily restricted by host device 406 without any installation of specialized software and without transmission of any data to network 412. Host device 406 also facilitates switching between multiple radio transceiver technologies supported by device 402.

For example, device 402 may be a WWAN card that is inserted or interfaced with host device 406 to facilitate connectivity to a network. Traditionally, when external devices such as WWAN cards are inserted into a host device, a virtual CD-ROM is provided to a user of host device 406. The virtual CD-ROM includes an executable that may be run to perform installation and configuration of device 402, drives associated with device 402, and a corresponding host specific connection manager. In accordance with the embodiments described herein, device 402 may be manufactured to include all components necessary within a web services interface associated with device CM 404. A UPNP (universal plug-and-play) 2.0 compatible client may also be included within deice CM 404 to register all available web based services with host device 406.

Device 402 may also include connectivity management logic stored within device CM 404 to self manage the power state of the device. Device 402 obtains the ability to enact decisions about its own power status. For example, if device 402 is not currently connected to any network, device 402 may enter a reduced power consumption state while providing a consistent "low power" state to host device 406. this allows host pc 406 to continue making decisions regarding connectivity through content management user interface 416 via browser 414 as if device 402 were still drawing full power. This is particularly useful if there is more than one device connected with host device 406. Thus, devices may control their own power based on their own data transmission needs. Multiple devices may be connected simultaneously, but only one device need be drawing full power at any given moment.

A host based packet routing scheme facilitates the use of multiple connections to maintain a power advantage. Traditional packet routing schemes depend on one or more network connections to be connected and active throughout the entire routing session. The connectivity management logic stored within device CM 404 allows that to be a logical requirement only and not a physical requirement. Since device 402 can maximize its own power consumption, when no packets are actively being delivered to a specific device for transmission, that device can reduce its power consumption (or proactively disconnect from the network in certain situations), while continuing to present an active connection to the host device 406. This is possible because the TCP/IP stack 408 which is disconnected is not the same stack that transmits the packets originally. Because the packets are transmitted by the host device 406 and routed through device 402, the packets may be cached while device 402 awakens and restores a network connection.

Furthermore, web based connection manager user interface instructs may use information from a network cloud 420 including an update and policy server 418 as well as local device data to instruct device 402 on potential network availability and establish connections with a network such as network 412, all without the need to implement a complex driver based 802.2 logical link control system. A component may reside in either a host operating system of host device 406 or within connection manager user interface 416, to instruct the devices, when they are in a powered down state, about possible network availability using information from update and policy server 418 as well as any other devices connected to host device 406.

Figure 5:
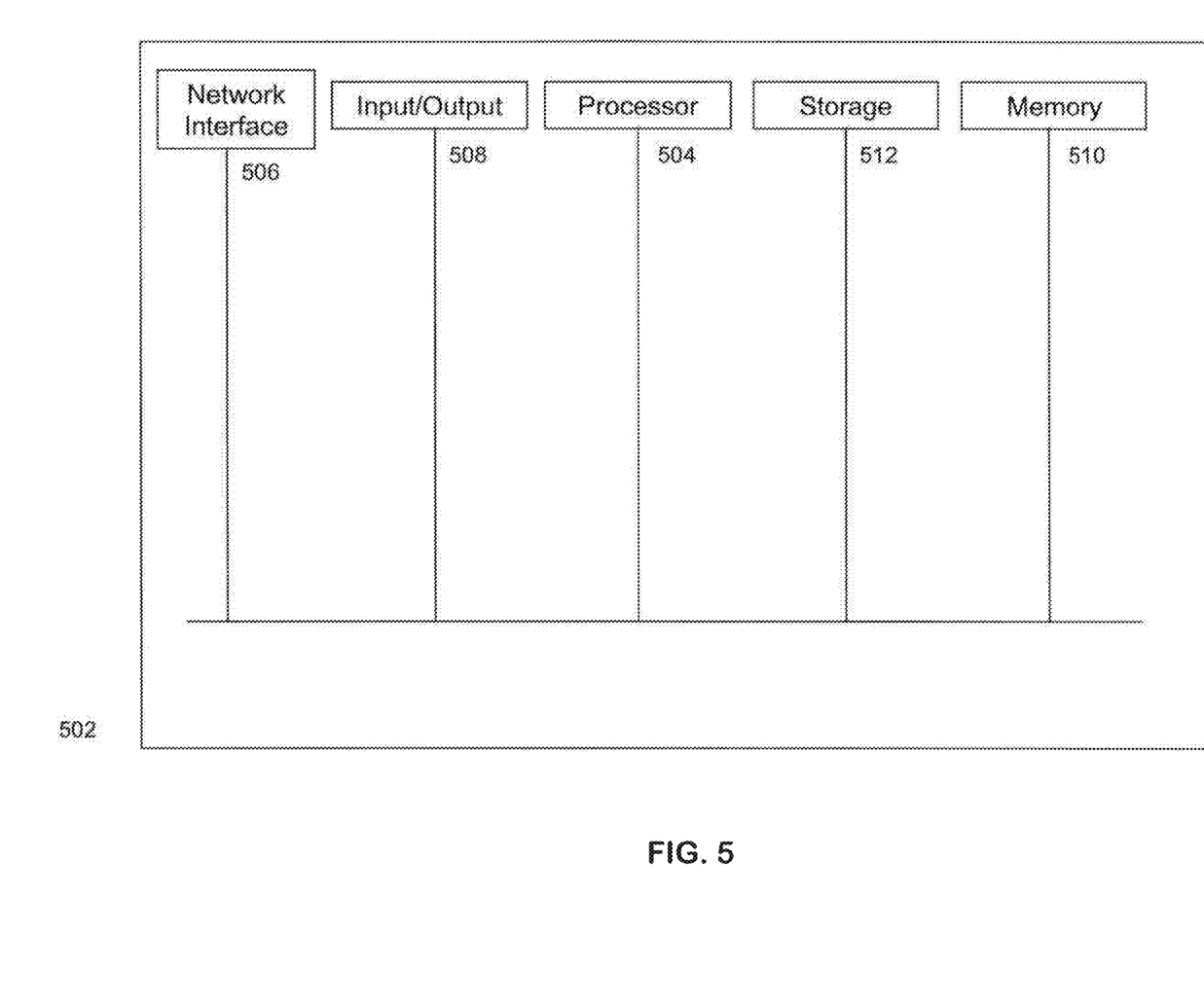
FIG. 5 illustrates a high-level diagram of a computing device for implementing device connectivity management, in accordance with an embodiment of the present invention.

The above described methods for device connectivity management may be implemented on a computing device using well-known processors, memory units, storage devices, software, and other components. A high level block diagram of such a computing device is illustrated in FIG. 5. Computing device 502 contains a processor 504 which controls overall operation of computer 502 by executing computer program instructions, which define such operation. The computer program instructions may be stored in a storage device 512, or other computer readable medium and loaded into memory 510 when execution of the computer program instructions is desired. Thus, all method steps described above, including the method steps illustrated in FIG. 2, may be defined by the computer program instructions stored in the memory 510 and/or storage 512 and controlled by the processor 504 executing in the computer program instructions. The computing device 502 also includes network interfaces 506 for communicating with other devices via a network. The computer 502 also includes other input/output devices 508 that enable user interaction with the computing device 502 (e.g., display, keyboard, mouse, speakers, buttons, etc.). One skilled in the art will recognize that an implementation of an actual computing device may contain other components as well, and that FIG. 5 is a high level representation of some of the components of such a computing device for illustrative purposes. In addition, computing device 502 may also perform other functionalities, such as those described above in connection with FIGS. 1 through 4.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by patent law. It is to be understood that the embodiments show and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for managing network connectivity for a device, the method comprising:
   detecting, by a connectivity platform, the device in response to powering on of the device, and establishing a connection with the device;
   detecting, by the connectivity platform, a plurality of networks, wherein the platform is independent of and agnostic to the device;
   determining, via the platform, a network policy relating to each of the plurality of networks;
   receiving, via the platform, signal information from the device, wherein the signal information relates to at least one of the plurality of networks;
   analyzing, via the platform, the network policy relating to each of the plurality of networks, and the signal information relating to the at least one of the plurality of networks, wherein the analyzing comprises at least one of:
   (a) determining at least one policy implementation factor of the device and selecting an optimal network from the plurality of networks for connection with the device based on the at least one policy implementation factor;
   (b) determining a device state of the device and selecting an optimal network from the plurality of networks for connection with the device based on the device state; and
   (c) analyzing content being transmitted to or being requested by the device and selecting an optimal network from the plurality of networks for the content based on the network policy and the signal information relating to each of the plurality of networks; and
   providing, via the platform, an instruction to the device for establishing or maintaining a connection between the device and a first network of the plurality of networks based on the analyzing.

2. The method of claim 1, wherein detecting a plurality of networks comprises:
   detecting a plurality of networks capable of establishing a connection with the device using at least one transceiver of the device.

3. The method of claim 1, wherein determining a network policy relating to each of the plurality of networks comprises:
   receiving the network policy relating to each of the plurality of networks from a policy server via a push policy based on the device being active.

4. The method of claim 1, wherein receiving signal information from the device comprises:
   receiving signal quality data associated with each of the plurality of networks in response to a pull policy of the device, the signal information comprising the signal quality data.

5. The method of claim 1, wherein analyzing the network policy relating to each of the plurality of networks, and the signal information relating to at least one of the plurality of networks comprises:
   comparing the network policies of the plurality of networks to determine at least one network policy compatible with the device; and
   comparing the signal information relating to each of the at least one network policy to determine an optimal network from the plurality of networks for establishing or maintaining a connection with the device.

6. The method of claim 5, wherein the optimal network is the first network.

7. The method of claim 1, further comprising:
   providing, via the platform, an instruction to the device for establishing or maintaining a connection between the device and a second network of the plurality of networks in response to the device losing the connection to the first network.

8. The method of claim 1, further comprising:
determining a second network of the plurality of networks to establish or maintain a connection with the device in response to determining that the connection with the first network is insufficient to support continued data transfer; and
transferring the connection of the device from the first network to the second network.

9. The method of claim 1, further comprising:
selecting a transceiver of a plurality of transceivers of the device to establish the connection between the device and the first network; and
transmitting an instruction to the device to power down transceivers not associated with the connection between the device and the first network.

10. The method of claim 1, wherein the connectivity platform is accessed by the device via an HTTP accessible user interface provided via the platform, wherein at least one of the signal information and the instruction is transmitted via the interface.

11. The method of claim 1, wherein the device is associated with a device policy, and further comprising:
transmitting an instruction to the device to override the device policy and use the network policy of the first network.

12. The method of claim 1, wherein the signal information is informative of at least one of signal strength and signal availability.

13. The method of claim 1, wherein at least one of the detecting, the receiving, and the providing is via an application protocol accessible interface provided via the platform to the device.

14. A system for managing network connectivity for a device, the system comprising:
a policy server storing a plurality of network policies associated with a plurality of networks, wherein the policy server storing a device policy associated with the device, wherein the policy server comprises a first processor and a first memory coupled to the first processor;
a connectivity platform independent of and agnostic to the device, wherein the connectivity platform comprises a second processor and a second memory coupled to the second processor, wherein the connectivity platform is in communication with the policy server, and configured to:
detect the plurality of networks;
determine the network policies associated with the plurality of networks;
receive signal information from the device, wherein the signal information relates to at least one of the plurality of networks;
analyze the network policies associated with the plurality of networks and the signal information relating to the at least one of the plurality of networks; and
provide an instruction to establish a connection between the device and a first network of the plurality of networks based on the analysis;
wherein the connectivity platform is further configured to perform at least one of:
(a) determine at least one policy implementation factor of the device; and select an optimal network from the plurality of networks for connection with the device based on the at least one policy implementation factor;

(b) determine a device state of the device; and select an optimal network from the plurality of networks for connection with the device based on the device state; and
(c) analyze content being transmitted to or being requested by the device; and select an optimal network from the plurality of networks for the content based on the network policy and the signal information relating to each of the plurality of networks.

15. The system of claim 14, wherein the connectivity platform is configured to detect the plurality of networks which are capable of establishing a connection with the device using at least one transceiver of the device.

16. The system of claim 14, wherein the connectivity platform is further configured to:
receive the network policies associated with the plurality of networks from the policy server via a push policy based on the device being active.

17. The system of claim 14, wherein the connectivity platform is further configured to:
receive signal quality data associated with each of the plurality of networks in response to a pull policy of the device, the signal information comprising the signal quality data.

18. The system of claim 14, wherein the connectivity platform is further configured to:
compare the network policies associated with the plurality of networks to determine at least one network policy compatible with the device; and
compare the signal information relating to each of the at least one network policy to determine an optimal network from the plurality of networks for establishing or maintaining a connection with the device.

19. The system of claim 18, wherein the optimal network is the first network.

20. The system of claim 14, wherein the connectivity platform is further configured to:
provide an instruction to establish or maintain a connection between the device and a second network of the plurality of networks in response to the device losing the connection to the first network.

21. The system of claim 14, wherein the connectivity platform is further configured to:
determine a second network of the plurality of networks to establish or maintain a connection with the device in response to determining that the connection with the first network is insufficient to support continued data transfer; and
transfer the connection of the device from the first network to the second network.

22. The system of claim 14, wherein the connectivity platform is further configured to:
select a transceiver of a plurality of transceivers of the device to establish the connection between the device and the first network; and
transmit an instruction to the device to power down transceivers not associated with the connection between the device and the first network.

23. The system of claim 14, wherein the connectivity platform is accessed by the device via an HTTP accessible user interface provided via the platform, wherein at least one of the signal information and the instruction is transmitted via the interface.

24. The system of claim 14, wherein the device is associated with a device policy; and wherein the connectivity platform is further configured to:

transmit an instruction to the device to override the device policy and use the network policy of the first network.

25. The system of claim 14, wherein the signal information is informative of at least one of signal strength and signal availability.

26. The system of claim 14, wherein the platform is configured to perform at least one of the detecting, the receiving, and the providing is via an application protocol accessible interface provided via the platform to the device.

27. A non-transitory computer readable medium encoded with computer program instructions for managing network connectivity for a device, the computer program instructions when executed by a processor, causing the processor to perform steps comprising:
    detecting, via a connectivity platform, a plurality of networks, wherein the platform is independent of and agnostic to the device;
    determining, via the platform, a network policy relating to each of the plurality of networks;
    receiving, via the platform, signal information from the device, wherein the signal information relates to at least one of the plurality of networks;
    analyzing, via the platform, the network policy relating to each of the plurality of networks and the signal information relating to the at least one of the plurality of networks; and
    providing, via the platform, an instruction to the device for establishing or maintaining a connection between the device and a first network of the plurality of networks based on the analyzing;
wherein the computer program instructions causing the processor to perform the analyzing step further causes the processor to perform steps comprising at least one of:
    (a) determining at least one policy implementation factor of the device and selecting an optimal network from the plurality of networks for connection with the device based on the at least one policy implementation factor;
    (b) determining a device state of the device and selecting an optimal network from the plurality of networks for connection with the device based on the device state; and
    (c) analyzing content being transmitted to or being requested by the device and selecting an optimal network from the plurality of networks for the content based on the network policy and the signal information relating to each of the plurality of networks.

28. The non-transitory computer readable medium of claim 27, wherein the computer program instructions causing the processor to perform the step of detecting a plurality of networks, further causes the processor to perform the step comprising:
    detecting a plurality of networks capable of establishing a connection with the device using at least one transceiver of the device.

29. The non-transitory computer readable medium of claim 27, wherein the computer program instructions causing the processor to perform the step of determining a network policy relating to each of the plurality of networks, further causes the processor to perform the step comprising:
    receiving the network policy relating to each of the plurality of networks from a policy server via a push policy based on the device being active.

30. The non-transitory computer readable medium of claim 27, wherein the computer program instructions causing the processor to perform the step of receiving signal information from the device, further causes the processor to perform the step comprising:
    receiving signal quality data associated with each of the plurality of networks in response to a pull policy of the device, the signal information comprising the signal quality data.

31. The non-transitory computer readable medium of claim 27, wherein the computer program instructions causing the processor to perform the step of analyzing the network policy relating to each of the plurality of networks and the signal information relating to at least one of the plurality of networks, further causes the processor to perform the steps comprising:
    comparing the network policies of the plurality of networks to determine at least one network policy compatible with the device; and
    comparing the signal information relating to each of the at least one network policy to determine an optimal network from the plurality of networks for establishing or maintaining a connection with the device.

32. The non-transitory computer readable medium of claim 31, wherein the optimal network is the first network.

33. The non-transitory computer readable medium of claim 27, further comprising computer program instructions when executed by the processor, cause the processor to perform the step comprising:
    providing an instruction to the device for establishing or maintaining a connection between the device and a second network of the plurality of networks in response to the device losing the connection to the first network.

34. The non-transitory computer readable medium of claim 27, further comprising computer program instructions when executed by the processor, cause the processor to perform the steps comprising:
    determining a second network of the plurality of networks to establish a connection with the device in response to determining that the connection with the first network is insufficient to support continued data transfer; and
    transferring the connection of the device from the first network to the second network.

35. The non-transitory computer readable medium of claim 27, further comprising computer program instructions when executed by the processor, cause the processor to perform the steps comprising:
    selecting a transceiver of a plurality of transceivers of the device to establish the connection between the device and the first network; and
    transmitting an instruction to the device to power down transceivers not associated with the connection between the device and the first network.

36. The non-transitory computer readable medium of claim 27, wherein the connectivity platform is accessed by the device via an HTTP accessible user interface provided via the platform, wherein at least one of the signal information and the instruction to the device for establishing the connection between the device and the first network is transmitted via the interface.

37. The non-transitory computer readable medium of claim 27, further comprising computer program instructions when executed by the processor, cause the processor to perform the step comprising:
    transmitting an instruction to the device to override a device policy associated with the device and use the network policy of the first network.

38. The non-transitory computer readable medium of claim 27, wherein the signal information is informative of at least one of signal strength and signal availability.

39. The non-transitory computer readable medium of claim 27, wherein at least one of the detecting, the receiving, and the providing is via an application protocol accessible interface provided via the platform to the device.

40. A method for managing network connectivity for a device, the method comprising:
  detecting, by a connectivity platform, a plurality of networks, wherein the platform is independent of and agnostic to the device;
  determining, via the platform, a network policy relating to each of the plurality of networks;
  receiving, via the platform, signal information from the device, wherein the signal information relates to at least one of the plurality of networks;
  providing, via the platform, an instruction to the device for establishing or maintaining a plurality of connections between the device and the plurality of networks; and
  providing, via the platform, an instruction to the device for terminating all except one of the plurality of connections between the device and the plurality of networks.

41. The method of claim 40, wherein providing an instruction to the device for terminating all except one of the plurality of connections between the device and the plurality of networks comprises at least one of:
  (a) determining based on the network policy relating to each of the plurality of networks and the signal information relating to the at least one of the plurality of networks which one of the plurality of networks is most capable for data to be transmitted or requested from the device; and
  (b) determining based on the network policy relating to each of the plurality of networks and the signal information relating to the at least one of the plurality of networks which one of the networks offers a highest data throughput rate.

42. The method of claim 40, further comprising:
  detecting a signal degradation in the one connection that has not been terminated;
  transmitting a wake-up signal to a plurality of transceivers to wake and determine signal quality with respective networks capable of connecting with the plurality of transceivers, the device comprising the transceivers;
  based on the determined signal quality, selecting a new network for connection.

43. The method of claim 42, wherein selecting a new network for connection is based upon at least one of:
  (a) which signal quality is best suited for data transmitted or requested by the device; and
  (b) which signal quality offers the highest data throughput signal.

44. The method of claim 40, wherein the device comprises a plurality of transceivers, wherein each of the transceivers is set to wake-up at a predetermined time to check signal quality with at least one of the plurality of networks.

45. The method of claim 40, wherein the signal information is informative of at least one of signal strength and signal availability.

46. The method of claim 40, wherein at least one of the detecting, the receiving, and at least one of the providing is via an application protocol accessible interface provided via the platform to the device.

* * * * *